United States Patent
Carlson et al.

(10) Patent No.: US 9,380,420 B1
(45) Date of Patent: Jun. 28, 2016

(54) ARCHITECTURE FOR RETENTION, RECOMMENDATION AND COLLABORATION OF MOBILE BASED TASK SESSIONS

(71) Applicant: International Business Machines Corporation, Armonk, NY (US)

(72) Inventors: Michael P. Carlson, Austin, TX (US); Lydia M. Do, Raleigh, NC (US); Indran Naick, Cedar Park, TX (US); Theodore J. L. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/990,665

(22) Filed: Jan. 7, 2016

(51) Int. Cl.
*H04W 24/00* (2009.01)
*H04W 4/02* (2009.01)

(52) U.S. Cl.
CPC ........................................ *H04W 4/02* (2013.01)

(58) Field of Classification Search
CPC .... G01C 21/34; G01C 21/3407; G01C 21/30; G01C 21/3484; G01C 21/32; G01C 21/00; G01C 21/3626; G01C 21/36; G01C 21/3415; G06F 165/00; H04W 4/12; H04W 4/046; H04W 4/02; H04W 4/028
USPC ............. 455/436, 436.3, 456.1, 456.2, 456.3, 455/456.5, 456.6, 457; 701/119, 209, 213; 340/438
See application file for complete search history.

(56) References Cited

U.S. PATENT DOCUMENTS

| | | | |
|---|---|---|---|
| 6,950,746 B2 * | 9/2005 | Yano | G01C 21/3415 340/988 |
| 2008/0294337 A1 * | 11/2008 | Dawson | G01C 21/26 701/533 |
| 2014/0171052 A1 | 6/2014 | Lamarca et al. | |
| 2014/0278064 A1 * | 9/2014 | Lee | G01S 19/19 701/428 |
| 2015/0088423 A1 | 3/2015 | Tuukkanen | |

OTHER PUBLICATIONS

Mell, P., et al., "The NIST Definition of Cloud Computing", National Institute of Standards and Technology Special Publication 800-145, Sep. 2011, pp. 1-7, U.S. Deparment of Commerce, United States.

* cited by examiner

*Primary Examiner* — Allahyar Kasraian
*Assistant Examiner* — Farid Seyedvosoghi
(74) *Attorney, Agent, or Firm* — Sherman IP LLP; Kenneth L. Sherman; Steven Laut (57) ABSTRACT

Retention, recommendation and collaboration of mobile based task sessions is provided. A processor: searches for a matching mobile session from one or more saved sessions and available community sessions, provides one or more recommendation selections, receives a selected recommendation for a current session or creates a new session as the current session, activates the available mobile resources, or obtains or provides a recommendation of mobile resources, records any mobile resources used as part of the current session along a route to the destination location, determines whether a new session is required and automatically recalculates a new matching session, stores information for a completed session, and stores the current session as a new session with the corresponding initial location, destination location and resources used along the route to the destination location.

1 Claim, 5 Drawing Sheets

ARCHITECTURE FOR RETENTION, RECOMMENDATION AND COLLABORATION OF MOBILE BASED TASK SESSIONS

BACKGROUND

Users tend to travel with their mobile device to repeated destinations or events (e.g., calendaring events). Although users may naturally repeat their behavior, such as using the same mobile devices, sensors, or apps and parking in the same garage(s), their tendency to perform the same set of actions may not always be the best course for the target destination given circumstances or environmental events that are dynamically changing.

SUMMARY

Embodiments of the invention relate to automatic retention, recommendation and collaboration of mobile based task sessions. One embodiment includes a computer program product for retention, recommendation and collaboration of mobile based task sessions, the computer program product comprising a computer readable storage medium having program instructions embodied therewith, the program instructions executable by a processor to cause the processor to: obtain, by the processor, intended destination location, initial location, and a set of available mobile resources including one or more of: a primary mobile device, any paired device, sensors, and apps. The processor further searches for a matching mobile session from one or more saved sessions and available community sessions. A matching session includes a matching initial location and destination location within a preset deviation radius. The processor provides one or more recommendation selections upon a determination of a matching mobile session. The one or more recommendation selections are ordered based on frequency used and user rating. The processor additionally receives a selected recommendation for a current session or creates a new session as the current session. The new session is based on the intended destination location, the initial location and the set of available mobile resources. The processor further activates the available mobile resources, or obtains or provides a recommendation of mobile resources upon a determination of other required mobile resources than the available mobile resources. The processor records any mobile resources used as part of the current session along a route to the destination location. Further, the processor determines whether a new session is required based on a deviation between a current location and a destination of the current session, and automatically recalculates a new matching session based on the current location set as the initial location and provides one or more new recommendation selections as the new session. Still further, upon completion of the current session, the processor stores information for a completed session including any mobile resources not already part of the current session. The information for the completed session is based on one or more of: increasing usage values of mobile resources that were part of the current session, decreasing usage values of mobile resources that were part of the current session and were not used by during the completed session, and increasing a success rate for the current session. The processor additionally stores the current session as a new session with the corresponding initial location, destination location and resources used along the route to the destination location upon a determination that the current session exceeded the deviation or upon receiving selection information for creation of a new session without overwrite of an original selected session. The new session is provided as part of an amended list of recommendation selections.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide an architecture to automatically identify the user's repeated destinations, store the destinations and activity for the destinations as sessions, share and compare the user's sessions with other users who have had similar sessions, and recommend courses of action to the user based on the user's previous session, other user's sessions, and current sensor information from the user's mobile device.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
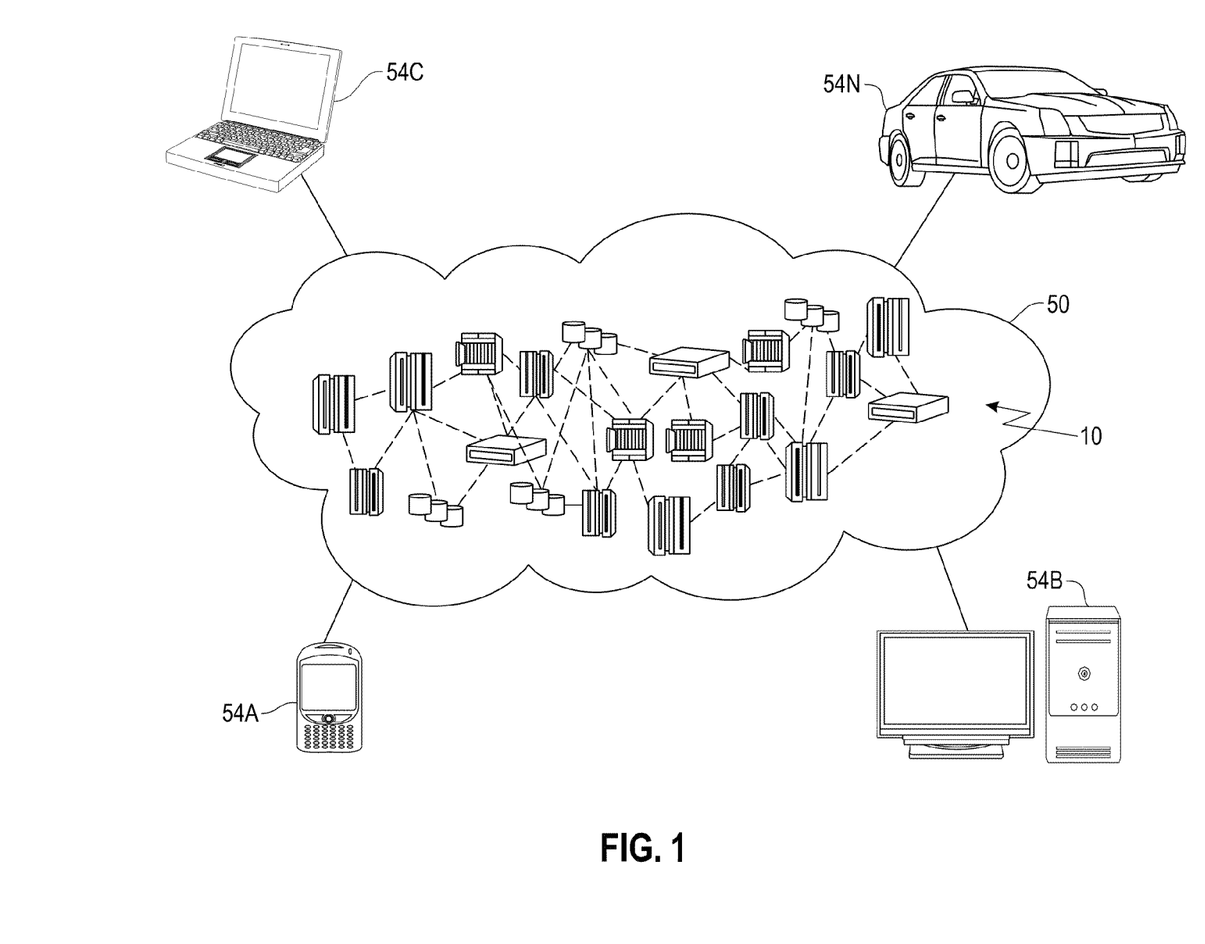
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
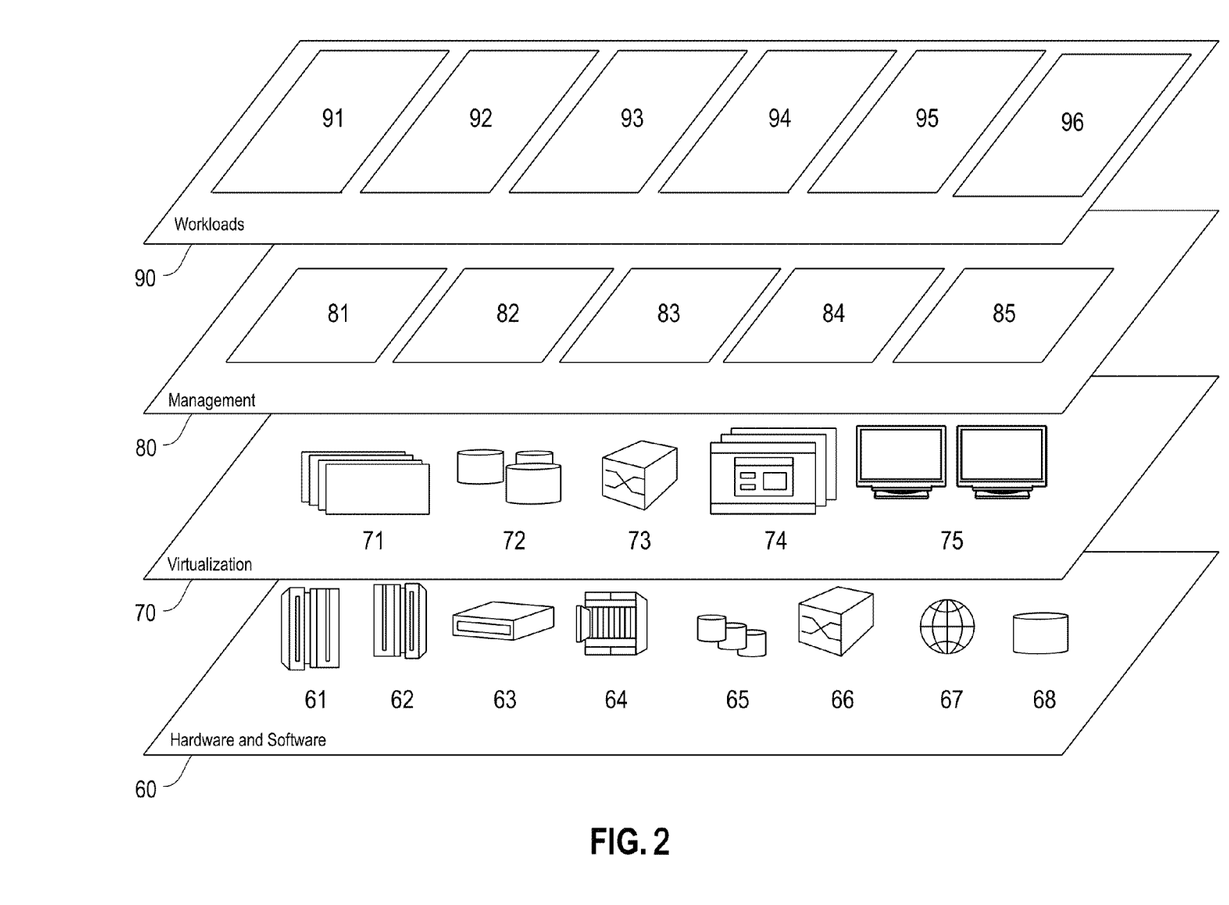
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and retention, recommendation and collaboration of mobile based task sessions 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the electronic device 420 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
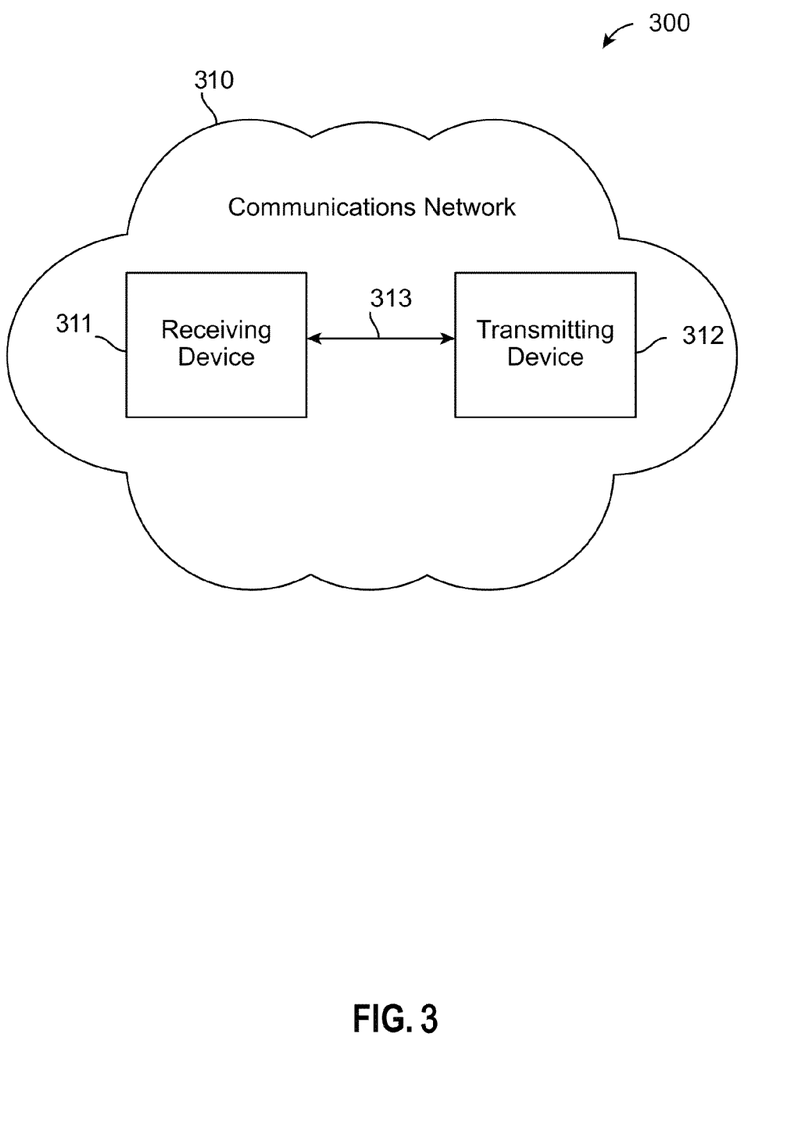
FIG. 3 shows a schematic view of a communications system, according to an embodiment.

FIG. 3 is a schematic view of a communications system 300, in accordance with one embodiment. Communications system 300 may include a communications device that initiates an outgoing communications operation (transmitting device 312) and a communications network 310, which transmitting device 312 may use to initiate and conduct communications operations with other communications devices within communications network 310. For example, communications system 300 may include a communication device (receiving device 311) that receives the communications operation from the transmitting device 312. Although communications system 300 may include multiple transmitting devices 312 and receiving devices 311, only one of each is shown in FIG. 3 to simplify the drawing.

Any suitable circuitry, device, system or combination of these (e.g., a wireless communications infrastructure including communications towers and telecommunications servers) operative to create a communications network may be used to create communications network 310. Communications network 310 may be capable of providing communications using any suitable communications protocol. In some embodiments, communications network 310 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 310 may support protocols used by wireless and cellular phones and personal email devices. Such protocols may include, for example, GSM, GSM plus EDGE, CDMA, quad-band, and other cellular protocols. In another example, a long range communications protocol can include Wi-Fi and protocols for placing or receiving calls using VOIP, LAN, WAN, or other TCP-IP based communication protocols. The transmitting device 312 and receiving device 311, when located within communications network 310, may communicate over a bidirectional communication path such as path 313, or over two unidirectional communication paths. Both the transmitting device 312 and receiving device 311 may be capable of initiating a communications operation and receiving an initiated communications operation.

The transmitting device 312 and receiving device 311 may include any suitable device for sending and receiving communications operations. For example, the transmitting device 312 and receiving device 311 may include mobile telephone devices, television systems, cameras, camcorders, a device with audio video capabilities, tablets, wearable devices, other smart devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, communications with calendaring applications, or combinations of these (e.g., video conferences).

Figure 4:
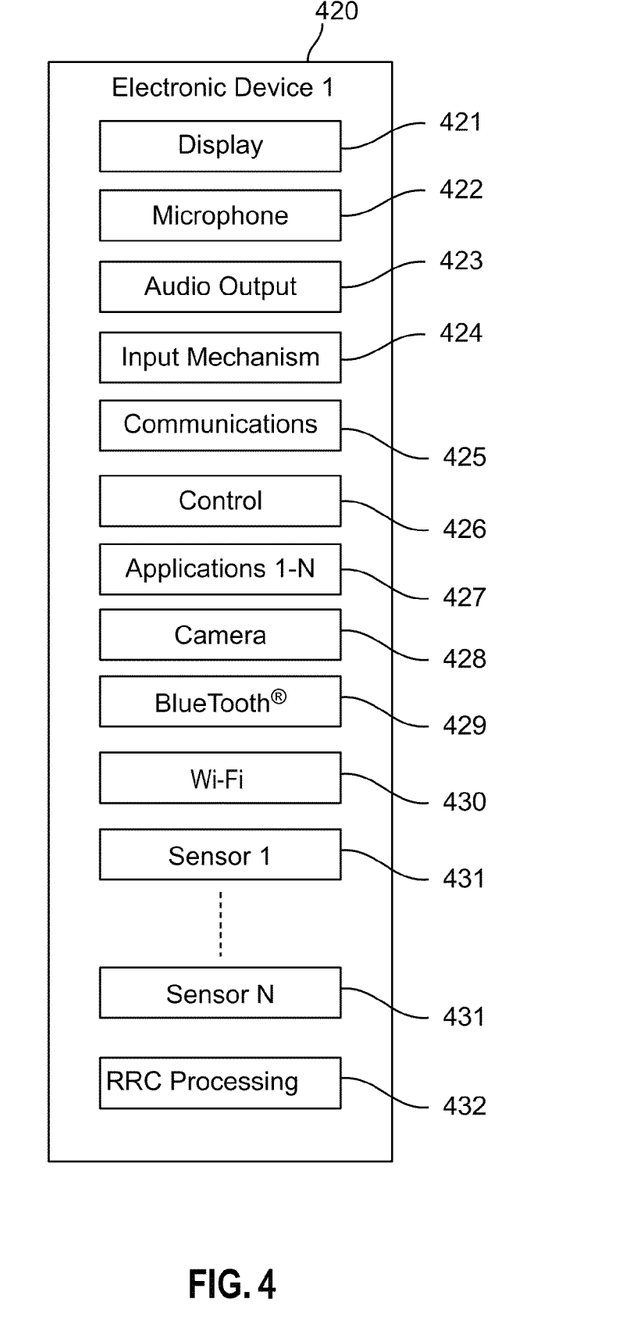
FIG. 4 shows a block diagram of architecture for a mobile electronic device system including retention, recommendation and collaboration processing, according to an embodiment.

FIG. 4 shows a functional block diagram of a mobile electronic device 420 that may be used for automatic retention, recommendation and collaboration (RRC) of mobile based task sessions, according to one embodiment. Both the transmitting device 312 and receiving device 311 may include some or all of the features of the electronics device 420. In one embodiment, the electronic device 420 may comprise a display 421, a microphone 422, an audio output 423, an input mechanism 424, communications circuitry 425, control circuitry 426, Applications 1-N 427 (e.g., a calendaring application), camera 428, a BLUETOOTH® interface 429, a Wi-Fi interface 430 and sensors 1 to N 431 (N being a positive integer), RRC processing 432 (e.g., RRC processing using one or more processors, sensor data, Wi-Fi information, GPS information, etc.) and any other suitable components. In one embodiment, applications 1-N 427 are provided and may be obtained from a cloud or server via a communications network 410, etc., where N is a positive integer equal to or greater than 1.

In one embodiment, all of the applications employed by the audio output 423, the display 421, input mechanism 424, communications circuitry 425, and the microphone 422 may be interconnected and managed by control circuitry 426. In one example, a handheld music player capable of transmitting music to other tuning devices may be incorporated into the electronics device 420.

In one embodiment, the audio output 423 may include any suitable audio component for providing audio to the user of electronics device 420. For example, audio output 423 may include one or more speakers (e.g., mono or stereo speakers) built into the electronics device 420. In some embodiments, the audio output 423 may include an audio component that is remotely coupled to the electronics device 420. For example, the audio output 423 may include a headset, headphones, or earbuds that may be coupled to communications device with a wire (e.g., coupled to electronics device 420 with a jack) or wirelessly (e.g., BLUETOOTH® headphones or a BLUETOOTH® headset).

In one embodiment, the display 421 may include any suitable screen or projection system for providing a display visible to the user. For example, display 421 may include a screen (e.g., an LCD, LED, etc. screen) that is incorporated in the electronics device 420. Display 421 may be operative to display content (e.g., information regarding communications operations or information regarding available media selections) under the direction of control circuitry 426.

In one embodiment, input mechanism 424 may be any suitable mechanism or user interface for providing user inputs or instructions to electronics device 420. Input mechanism 424 may take a variety of forms, such as a button, keypad, dial, a click wheel, or a touch screen. The input mechanism 424 may include a multi-touch screen.

In one embodiment, communications circuitry 425 may be any suitable communications circuitry operative to connect to a communications network (e.g., communications network 110, FIG. 1) and to transmit communications operations and media from the electronics device 420 to other devices within the communications network. Communications circuitry 425 may be operative to interface with the communications network using any suitable communications protocol such as, for example, Wi-Fi (e.g., an IEEE 802.11 protocol), BLUE-TOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 425 may be operative to create a communications network using any suitable communications protocol. For example, communications circuitry 425 may create a short-range communications network using a short-range communications protocol to connect to other communications devices. For example, communications circuitry 425 may be operative to create a local communications network using the Bluetooth® protocol to couple the electronics device 420 with a BLUE-TOOTH® headset.

In one embodiment, control circuitry 426 may be operative to control the operations and performance of the electronics device 420. Control circuitry 426 may include, for example, one or more processors, a bus (e.g., for sending instructions to the other components of the electronics device 420), memory, storage, or any other suitable component for controlling the operations of the electronics device 420. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 420 performs communications operations (e.g., saving contact information related to communications operations or storing information related to different media types and media items selected by the user).

In one embodiment, the control circuitry 426 may be operative to perform the operations of one or more applications implemented on the electronics device 420. Any suitable number or type of applications may be implemented. Although the following discussion will enumerate different applications, it will be understood that some or all of the applications may be combined into one or more applications. For example, the electronics device 420 may include a calendaring application (e.g., MICROSOFT® OUTLOOK®, GOOGLE® Calendar, etc.), an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 420 may include one or multiple applications operative to perform communications operations. For example, the electronics device 420 may include a messaging application, a mail application, a voicemail application, an instant messaging application (e.g., for chatting), a videoconferencing application, a fax application, or any other suitable applications for performing any suitable communications operation.

In some embodiments, the electronics device 420 may include a microphone 422. For example, electronics device 420 may include microphone 422 to allow the user to transmit audio (e.g., voice audio) for speech control and navigation of applications 1-N 427, during a communications operation or as a means of establishing a communications operation or as an alternative to using a physical user interface. The microphone 422 may be incorporated in the electronics device 420, or may be remotely coupled to the electronics device 420. For example, the microphone 422 may be incorporated in wired headphones, the microphone 422 may be incorporated in a wireless headset, the microphone 422 may be incorporated in a remote control device, etc.

In one embodiment, the camera 428 comprises one or more camera devices that include functionality for capturing still and video images, editing functionality, communication interoperability for sending, sharing, etc., photos/videos, etc.

In one embodiment, the BLUETOOTH® interface 429 comprises processes and/or programs for processing BLUE-TOOTH® information, and may include a receiver, transmitter, transceiver, etc.

In one embodiment, the electronics device 420 may include multiple sensors 1 to N 431, such as accelerometer, gyroscope, microphone, temperature, light, barometer, magnetometer, compass, radio frequency (RF) identification sensor, global positioning system (GPS), Wi-Fi, etc. In one embodiment, the multiple sensors 1-N 431 provide information to the RRC processing 432. In one embodiment, the multiple sensors 1-N 431 may be aggregated or used from different electronic devices, such as an electronic device 420 (e.g., a smartphone) and another electronic device 420 (e.g., a wearable device such as a smartwatch). For example, a gyroscope sensor and/or a temperature may be used from a wearable device, and a microphone sensor may be used from a smartphone.

In one embodiment, the electronics device 420 may include any other component suitable for performing a communications operation. For example, the electronics device 420 may include a power supply, ports, or interfaces for coupling to a host device, a secondary input mechanism (e.g., an ON/OFF switch), or any other suitable component.

In one embodiment, the RRC processing 432 provides the following processing with devices and applications (or apps) 1-N 427 electronic device 420, along with any required communication with a cloud computing environment 50, network 310, etc. In one embodiment, a user's intended session is obtained (e.g., from a memory device of electronic device 420, or from the cloud computing environment 50, etc.). The destination location is obtained from the user or automatically/dynamically from an application 1-N 427, such as an event from a calendaring application based on the location of an event on the user's calendar application. The current location is automatically obtained as the initial location, unless overridden by the user. The current set of mobile resources (primary and paired devices, sensors, and apps) are automatically obtained, unless this feature is selected to be overridden by the user.

In one embodiment, the RRC processing 432 searches for a matching mobile session. In one example, the RRC processing 432 checks the user's saved sessions and available community sessions to find session(s) with matching initial and destination locations within a preset deviation radius. If matching sessions are found, the RRC processing 432 proceeds to recommend sessions for user selection, otherwise if no sessions match the intended session, the RRC processing 432 proceeds to prepare the user to travel to a destination based on the current session as described below.

In one embodiment, the RRC processing 432 recommends sessions for user selection as follows. In one example, the recommended existing sessions are ordered by frequency used and user rating. If a user selects an existing session, that session is used as the current session and the RRC processing 432 proceeds to prepare the user to travel to a destination based on the current session as described below. If the user does not select an existing session, the RRC processing 432 proceeds to create a new session as described below.

In one embodiment, the RRC processing 432 creates a new session based on the intended session attributes: initial and destination locations and current mobile resources. The new session is used as the current session.

In one embodiment, the RRC processing 432 prepares for the user to travel to the destination based on the current session. In one example, if the current selected session's set of mobile resources are different from what the user currently has (e.g., currently on the electronic device 420), the RRC processing 420 automatically activates or obtains those resources (e.g., an app(s) is(are) downloaded, virtual components are obtained or created, etc.). If it is not possible to automatically activate or obtain resources that were used in the current session's profile, the RRC processing 432 provides a recommendation (e.g., voice, display, etc.) that the user obtain those mobile resources.

In one embodiment, as the user travels to the destination based on current session, the RRC processing 432 automatically uses mobile resources that are part of the current session. In one example, the user can override automatic use of mobile resources to have the session provide prompts to use the resource (turn on device, activate the sensor, interact with the app, etc.). If the user uses different devices, sensors, or apps, the RRC processing 432 records those as part of the current session. In one example, the RRC 432 records the location and duration that devices, sensors, or apps were used along the route of the current session. If the user reaches the destination location, the RRC processing 432 proceeds to store the completed session information for the user and optionally, a community of users. If the user is still travelling to the destination location, the RRC processing 432 determines if a new session is needed.

In one embodiment, if the delta of the current session is greater than the selected session (e.g., based on deviation between the current and selected session routes), the RRC processing 432 automatically recalculates a new matching session based on the current location as the initial location (as described above) and provides a new recommended list for the user to choose from as the new current session. If a new session was selected, the RRC processing 432 returns to the processing as described above with the new session as the current session. In one example, the RRC processing 432 may update and save the old current session, decreasing the success rate for that session. If a new session was not needed or not selected, the RRC processing 432 returns to processing as described above before continuing.

In one embodiment, if the current session does not exceed a delta from the selected session, the RRC processing 432 automatically stores the mobile resources used as part of the user's session. In one example, the RRC processing 432 adds new resources used if not already part of the session. Usage values of resources that were part of the session are increased. Usage values of resources that were part of the selected session, but were not used by the user during the completed session are decreased. The success rate for the session is increased. If the current session exceeded the delta or if the user wanted to create a new session and not overwrite the old session, the RRC processing 432 stores the current session as a new session with the corresponding initial and destination events and resources used along the route. In one embodiment, if the completed session was not part of a community session, the RRC processing 432 provides the user the option to share the session with the community.

In one embodiment, a session information profile includes the following:
    initial and destination locations;
    route taken between locations;
    mobile resources (devices, sensors, and apps) used along the session route, including GPS location, duration used, and frequency used;
    frequency the session has been used by users;
    usage and popularity ratings of the session by users; and
    success rate.

In one embodiment, examples of electronic device 420 information includes:
    GPS—initial, current, and destination (intended) locations;
    where the user's device started, is currently at, and intended destination;
    BLUETOOTH®—devices that the user may have paired with or used during the task;
    microphone—sounds in range of and recognizable by the device;
    camera—visual images in range of and recognizable by the device; and
    watch or wrist device—movement, sensors, or usage of the device by the user during the session.

In one embodiment, an example session may include the following. A user travels with the electronic device 420 to an event. The user desires to arrive 30 minutes before the event begins to park in parking lot X. If the user has never traveled to this event before, the RRC processing 432 plots the route and target garage, recommending a time to start travel to arrive 30 minutes before the event. If the user has session information stored for the electronic device 420, the RRC processing 432 selects the route and target garage based on the past session that most closely matches the user's current state, such as weekday vs. weekend, day vs. night, traffic congestion vs. free flow, devices and sensors available, etc. In addition to data obtained from Internet sources, such as reported traffic hazards, the electronic device 420 may pull information from external sensors to determine if there's a possible interruption in the route. In one example, if the electronic device 420 senses a siren from the microphone 422, the device queries the user to scan the area with the camera 428 to determine where the emergency vehicle might be, which is information that might not be available from Internet sources. This may cause the architecture to look for additional content, such as to scan police and emergency scanners to determine if an accident has been reported, and reroute the user accordingly.

Depending on how soon the user might arrive in advance of an event, in one embodiment, the RRC processing 432 may route the user to a closer garage Y or if the user is running late, to a further garage Z that still has open parking (based on receiving external garage parking status information). The RRC processing 432 calculates this information by drawing upon user's past sessions (where the user may have parked based on a given time, such as arriving to work), what past users may have done (the average place where other users may have parked for their arrival time), or in real time what other users with a similar session profile are doing (finding success in parking in lot R while others are driving around parking lot X without finding an empty spot). One or more embodiments obtain mobile resources to use along the way of a route and share successful and failed profiles for community use.

Figure 5:
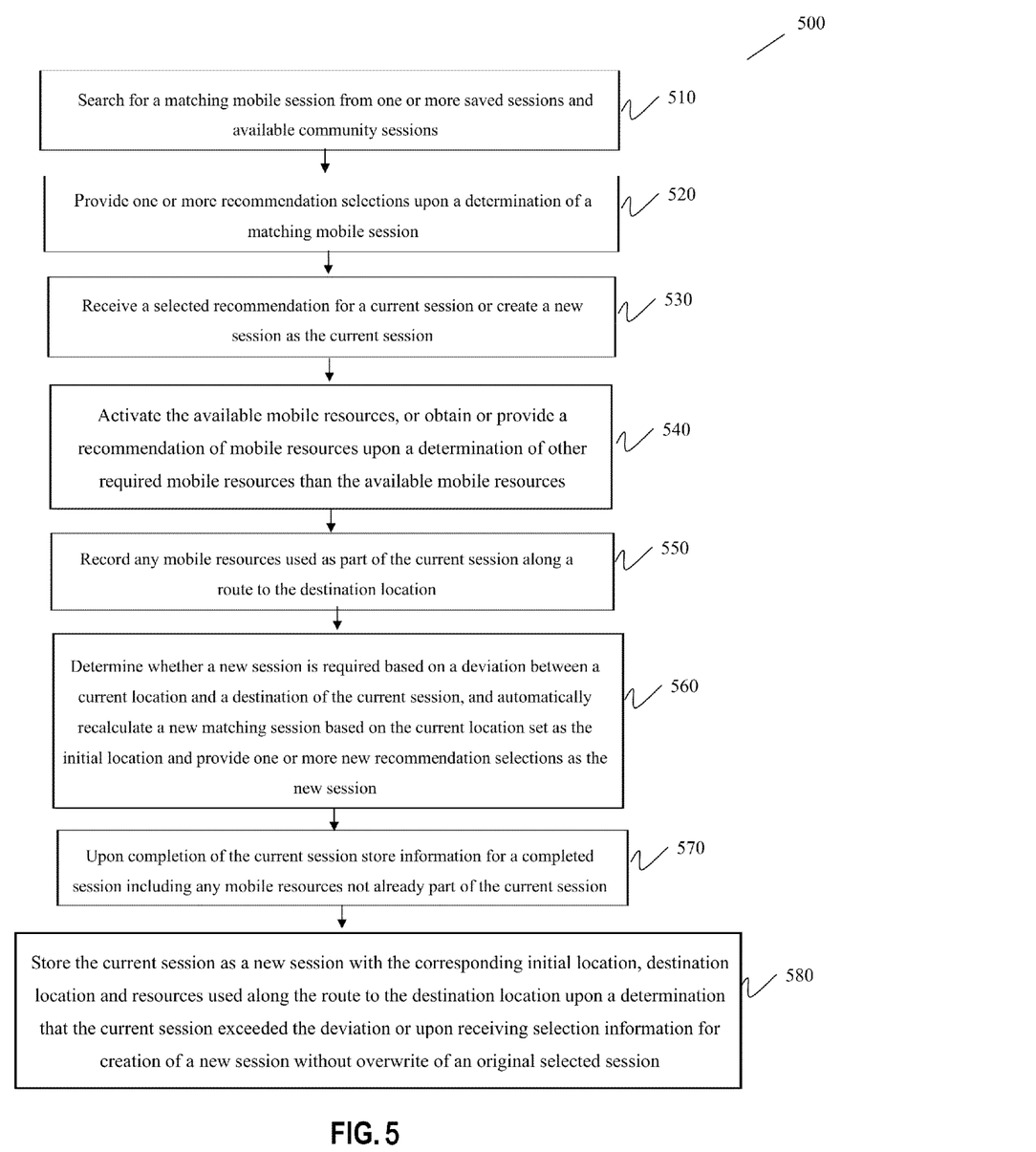
FIG. 5 illustrates a block diagram for a process automatic retention, recommendation and collaboration of mobile based task sessions, according to one embodiment.

FIG. 5 illustrates a block diagram for a process 500 for RRC processing, according to one embodiment. The process 500 includes a computer program product for recommendation and collaboration of mobile based task sessions. The computer program product includes a computer readable storage medium having program instructions embodied therewith. The process 500 may use a processor to obtain intended destination location, initial location, and a set of available mobile resources including one or more of: a primary mobile device, any paired device, sensors, and apps. In block 510, the program instructions are executable by a processor (e.g., a processor in electronic device 420, FIG. 4, a processor in the hardware and software layer 60, FIG. 2, etc.) to cause the processor to search for a matching mobile session from one or more saved sessions and available community sessions. In one example, a matching session includes a matching initial location and destination location within a preset deviation radius. In block 520, the processor provides one or more recommendation selections upon a determination of a matching mobile session. The one or more recommendation selections are ordered based on frequency used and user rating. In block 530, the processor receives a selected recommendation for a current session or creates a new session as the current session. The new session is based on the intended destination location, the initial location and the set of available mobile resources.

In block 540, the processor activates the available mobile resources, or obtains or provides a recommendation of mobile resources upon a determination of other required mobile resources than the available mobile resources. In block 550 the processor records any mobile resources used as part of the current session along a route to the destination location. In block 560 the processor determines whether a new session is required based on a deviation between a current location and a destination of the current session, and automatically recalculates a new matching session based on the current location set as the initial location and provides one or more new recommendation selections as the new session. In block 570, upon completion of the current session, the processor stores information for a completed session including any mobile resources not already part of the current session. The information for the completed session is based on one or more of: increasing usage values of mobile resources that were part of the current session, decreasing usage values of mobile resources that were part of the current session and were not used by during the completed session, and increasing a success rate for the current session. In block 580, the processor additionally stores the current session as a new session with the corresponding initial location, destination location and resources used along the route to the destination location upon a determination that the current session exceeded the deviation or upon receiving selection information for creation of a new session without overwrite of an original selected session. The new session is provided as part of an amended list of recommendation selections.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for retention, recommendation and collaboration of mobile based task sessions, the computer program product comprising a computer readable storage device having program instructions embodied therewith, the program instructions executable by a processor to cause the processor to:
   obtain, by the processor, intended destination location, initial location, and a set of available mobile resources including one or more of: a primary mobile device, any paired device, sensors, and applications;
   search, by the processor, for a matching mobile session from one or more saved sessions and available community sessions, wherein a matching session includes a matching initial location and destination location within a preset deviation radius;
   provide, by the processor, one or more recommendation selections upon a determination of a matching mobile session, wherein the one or more recommendation selections are ordered based on frequency used and user rating;
   receive, by the processor, a selected recommendation for a current session or create a new session as the current session, wherein the new session is based on the intended destination location, the initial location and the set of available mobile resources;
   activate, by the processor, the available mobile resources, or obtain or provide a recommendation of mobile resources upon a determination of other required mobile resources than the available mobile resources;
   record, by the processor, any mobile resources used as part of the current session along a route to the destination location;
   determine, by the processor, whether a new session is required based on a deviation between a current location and a destination of the current session, and automatically recalculate a new matching session based on the current location set as the initial location and provide one or more new recommendation selections as the new session;
   upon completion of the current session:
   store, by the processor, information for a completed session including any mobile resources not already part of the current session, wherein the information for the completed session is based on of:
   increasing usage values of mobile resources that were part of the current session;
   decreasing usage values of mobile resources that were part of the current session and were not used by during the completed session; and
   increasing a success rate for the current session; and
   store, by the processor, the current session as a new session with the corresponding initial location, destination location and resources used along the route to the destination location upon a determination that the current session exceeded the deviation and upon receiving selection information for creation of a new session without overwrite of an original selected session, wherein the new session is provided as part of an amended list of recommendation selections.

* * * * *